(12) United States Patent
Kim (10) Patent No.: US 12,249,877 B2
(45) Date of Patent: Mar. 11, 2025

(54) POWER PACK OF ELECTRIC POWER STEERING APPARATUS

(71) Applicant: HYUNDAI MOBIS CO., LTD., Seoul (KR)

(72) Inventor: Joon Hyung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 905 days.

(21) Appl. No.: 17/202,778

(22) Filed: Mar. 16, 2021

(65) Prior Publication Data

US 2021/0291895 A1  Sep. 23, 2021

(51) Int. Cl.
| | |
|---|---|
| *H02K 11/33* | (2016.01) |
| *H02K 5/22* | (2006.01) |
| *H02K 11/30* | (2016.01) |
| *H02K 11/38* | (2016.01) |
| *B62D 5/04* | (2006.01) |

(52) U.S. Cl.
CPC .............. *H02K 11/33* (2016.01); *H02K 5/225* (2013.01); *H02K 11/30* (2016.01); *H02K 11/38* (2016.01); *B62D 5/0406* (2013.01); *B62D 5/046* (2013.01); *H02K 2211/03* (2013.01)

(58) Field of Classification Search
CPC .......... H02K 5/225; H02K 11/33; H02K 7/14; H02K 2211/03; H02K 11/30; H02K 11/38; H02K 11/00; H02K 5/00; B62D 5/0406; B62D 5/046
USPC .................................................. 310/71, 68 R
See application file for complete search history.

(56) References Cited

U.S. PATENT DOCUMENTS

| 2020/0366168 A1* | 11/2020 | Abe | B62D 5/046 |
| 2020/0373867 A1* | 11/2020 | Yamashita | B62D 5/0403 |
| 2020/0391681 A1* | 12/2020 | Kabune | H02M 7/53871 |

FOREIGN PATENT DOCUMENTS

| DE | 102018216752 A1 * | 4/2019 | ........... B62D 5/0406 |
| JP | 2016-171664 | 9/2016 | |
| KR | 10-1493094 | 2/2015 | |

OTHER PUBLICATIONS

Maeshima O, Circuit Board, Motor Drive Unit and Electric Power Steering Device, Apr. 4, 2019, DE 102018216752 (English Machine Translation) (Year: 2019).*
Korean Office Action dated Nov. 18, 2024 issued in KR 10-2020-0032899.

* cited by examiner

*Primary Examiner* — Alexander A Singh
(74) *Attorney, Agent, or Firm* — DLA PIPER LLP US (57) ABSTRACT

A power pack of an EPS may include: a motor unit including a motor having a plurality of windings; a plurality of driving units each including an inverter configured to drive the motor by supplying power to any one of the plurality of windings; a plurality of control units each including a controller configured to control the inverter in order to control the operation of the motor; a plurality of power supply units configured to supply power to the motor; and a board unit coupled to the motor unit, and including a first circuit board and a second circuit board, which are electrically connected to each other, wherein the power pack includes a plurality of single ECUs, each of which is constituted by connecting any one of the control units, any one of the driving units and any one of the power supply units.

8 Claims, 7 Drawing Sheets

POWER PACK OF ELECTRIC POWER STEERING APPARATUS

CROSS-REFERENCE TO RELATED APPLICATION

This application claims priority from and the benefit of Korean Patent Application No. 10-2020-0032899, filed on Mar. 17, 2020, which is hereby incorporated by reference for all purposes as if set forth herein.

BACKGROUND

Field

Exemplary embodiments of the present disclosure relate to a power pack of an EPS (Electric Power Steering Apparatus), and more particularly, to a power pack of an EPS, which includes a full redundancy system capable of securing stability and reliability and reducing the size thereof.

Discussion of the Background

In general, an EPS may include an electric motor and an ECU (Electronic Control Unit) for driving the electric motor, and control a steering operation of a vehicle.

Recently, in order to secure system stability and reliability in an autonomous vehicle using such an EPS, research is being conducted on a method for configuring redundancy for a system such that a product is driven in the best environment. However, when the redundancy for the system is simply configured in the EPS, the package size of a power pack may be increased, the manufacturing cost may be raised, and the assembly process may also become complex. In particular, a plurality of parts are mounted in the vehicle and thus occupy a large portion of the inner space of the vehicle. Therefore, when a redundancy system is mounted, spatial constraints may occur.

The related art of the present disclosure is disclosed in Korean Patent No. 10-1493094 registered on Feb. 6, 2015 and entitled "Electric Power Steering Apparatus".

SUMMARY

Various embodiments are directed to a power pack of an EPS which can secure a complementary system in which a certain part among parts constituting the ECU can replace another part when the another part has broken down, thereby securing system stability and reliability.

Also, various embodiments are directed to a power pack of an EPS, in which circuits for implementing full redundancy are distributed and disposed on a first circuit board and a second circuit board, thereby optimizing the arrangement of the circuits and reducing the size of an apparatus.

Also, various embodiments are directed to a power pack of an EPS, which can simplify an assembly process and reduce the manufacturing cost.

In an embodiment, a power pack of an EPS may include: a motor unit including a motor having a plurality of windings; a plurality of driving units each including an inverter configured to drive the motor by supplying power to any one of the plurality of windings; a plurality of control units each including a controller configured to control the inverter in order to control the operation of the motor; a plurality of power supply units configured to supply power to the motor; and a board unit coupled to the motor unit, and including a first circuit board and a second circuit board, which are electrically connected to each other, wherein the power pack includes a plurality of single ECUs (Electronic Control Units), each of which is constituted by connecting any one of the control units, any one of the driving units and any one of the power supply units, wherein at least one of the ECUs is configured to control the operation of the motor, and any one of the ECUs is configured to control the operation of the motor when another one of the ECUs is abnormal.

The plurality of control units may be installed on the first circuit board, and the plurality of driving units and the plurality of power supply units may be installed on the second circuit board.

The control unit may include a control circuit including the controller, the driving unit may include a driving circuit connected to the control circuit, and the power supply unit may include a power supply circuit connected to the control circuit and the driving circuit.

The plurality of control circuits may be installed in parallel to each other on the first circuit board, the plurality of driving circuits may be installed in parallel to each other on the second circuit board, and the plurality of power supply circuits may be installed in parallel to each other on the second circuit board.

The board unit may further include a board connector installed on the first and second circuit boards and configured to connect the control circuit, the driving circuit and the power supply circuit to transfer power and signals.

The first and second circuit boards may be formed in a plate shape, and sequentially stacked in a motor housing included in the motor unit.

The power pack may further include a cover coupled to the motor unit so as to cover the board unit.

The power pack may further include a connector unit configured to transfer signals to the control unit and the power supply unit or supply power to the control unit and the power supply unit.

The connector unit may include: a connector body coupled to a motor housing included in the motor unit; a plurality of signal connector units each including a signal connector formed on the connector body, and a signal connector pin corresponding to the signal connector and protruding from the connector body so as to be directly or indirectly connected to the control unit; and a plurality of power connector units each including a power connector formed on the connector body, and a power connector pin corresponding to the power connector and protruding from the connector body so as to be connected to the power supply unit.

The motor housing may include: a winding hole through which the plurality of windings are drawn; a signal pin through-hole through which the signal connector pin is passed; and a power pin through-hole through which the power connector pin is passed.

The power pack in accordance with the embodiment of the present disclosure may implement full redundancy for the system to control the operation of the motor, thereby securing a complementary system in which any one part of the parts constituting the ECU can replace another part when the another part has broken down. In particular, when the power pack is applied to an autonomous vehicle, it is possible to secure the stability and reliability of the system.

As the circuits for implementing full redundancy for the EPS are distributed and disposed on the first and second circuit boards, the disposition of the circuits may be optimized, which makes it possible to accomplish the reduction in size of the apparatus.

Furthermore, the power connector units and the signal connector units may be formed as one body with the connector body which is one molding product, which makes it possible to reduce the size of the apparatus further than in the case in which the power connector units and the signal connector units are formed on a separate molding product in the conventional redundancy system.

Furthermore, the board unit and the connector unit may be coupled to the motor housing, which makes it possible to simplify the assembly process while reducing the manufacturing cost.

DETAILED DESCRIPTION OF THE ILLUSTRATED EMBODIMENTS

Hereinafter, a power pack of an EPS will be described below with reference to the accompanying drawings through various exemplary embodiments.

First, the following embodiments are suitable for promoting understandings of the technical features of the power pack of the EPS. However, the present disclosure is not limited to the following embodiments or the technical features of the present disclosure are not limited by the following embodiments, and the present disclosure may be modified in various manners without departing from the scope of the present disclosure.

Referring to FIGS. 1 to 5, a power pack 100 of an EPS in accordance with an embodiment of the present disclosure may be applied to an EPS of a vehicle, and configured to secure redundancy for an operation of a motor 210, for the sake of the stability of a steering system.

In the following descriptions and illustrated embodiments, the case in which the power pack includes two ECUs (Electronic Control Units) will be taken as an example. However, the number of ECUs is not limited to two, but may be set to three or more.

Referring to FIGS. 1 to 6, the power pack 100 of the EPS in accordance with the embodiment of the present disclosure includes a motor unit 200, a plurality of driving units 510 and 520, a plurality of control units 410 and 420, a plurality of power supply units 610 and 620 and a board unit 300.

The motor unit 200 may output an operation force when a driver of the vehicle performs a steering operation through a steering system of the vehicle. The operation force outputted by the motor unit 200 may provide the optimal steering state.

The motor unit 200 may include the motor 210 having a plurality of windings 211 and 212. For example, the motor 210 may have a double winding structure including a first winding 211 and a second winding 212. However, the number of windings in the present embodiment is not limited thereto.

The motor unit 200 may further include a motor housing 220 having a space in which the motor 210 is housed. The motor housing 220 may include winding holes through which the respective windings of the motor 210 are drawn. When the motor 210 has a double winding structure, the motor housing 220 may include a first winding hole 231 through which the first winding 211 is drawn and a second winding hole 232 through which the second winding 212 is drawn.

The driving units 510 and 520 may be configured as a plurality of driving units. The driving units 510 and 520 may include inverters 511 and 521 each configured to drive the motor 210 by supplying power to any one of the windings 211 and 212.

The driving units 510 and 520 may be implemented as driving circuits 510 and 520. The driving circuits 510 and 520 may include the inverters 511 and 521 and drivers 512 and 522 configured to control the inverters, respectively.

The driving units in accordance with the present disclosure may be configured as two driving units and implemented as first and second driving circuits 510 and 520 connected in parallel to each other.

The first driving circuit 510 may include a first inverter 511 and a first driver 512, and the second driving circuit 520 may include a second inverter 521 and a second driver 522.

The first inverter 511 may provide a current to the first winding 211, and the second inverter 521 may provide a current to the second winding 212. In this case, each of the first and second inverters 511 and 521 may be controlled to provide a half of the rated current of the motor 210.

Therefore, when the first and second inverters 511 and 521 are all driven, 100% of the rated current of the motor 210 may be provided, and when any one of the first and second inverters 511 and 521 is driven, 50% of the rated current of the motor 210 may be provided.

The power pack may include the plurality of control units 410 and 420 including controllers 411 and 421, respectively, which are connected to the inverters 511 and 521 to control the inverters 511 and 521.

The control units 410 and 420 may be implemented as control circuits 410 and 420 including the controllers 411 and 421, respectively. The control circuits 410 and 420 may control overall operations of the power pack 100, and be connected to the driving circuits 510 and 520 so as to control the inverters 511 and 521 to drive the motor 210. Each of the controllers 411 and 421 included in the control circuits 410 and 420 may be an MCU (Micro Controller Unit).

The control units 410 and 420 may be configured as two control units. In the present embodiment, the control units 410 and 420 may include a first control circuit 410 and a second control circuit 420.

The first and second control circuits 410 and 420 may be connected in parallel to each other. The first and second control circuits 410 and 420 may exchange acknowledgement signals to check each other's failures.

The first control circuit 410 may be connected to the first driving circuit 510, and the second control circuit 420 may be connected to the second driving circuit 520. The first control circuit 410 may include a first controller 411, and the second control circuit 420 may include a second controller 421.

The power supply units 610 and 620 may be configured as a plurality of power supply units. Each of the power supply units 610 and 620 may be configured to supply power to the motor 210.

Specifically, the power supply units 610 and 620 may be implemented as power supply circuits 610 and 620 which are connected to the control circuits 410 and 420 and the driving circuits 510 and 520, respectively.

The power supply units 610 and 620 may be configured as two power supply units. In the present embodiment, the power supply units 610 and 620 may include a first power supply circuit 610 and a second power supply circuit 620, which are connected in parallel to each other.

The first power supply circuit 610 may be connected to the first control circuit 410 and the first driving circuit 510, and connected to power connectors 741 and 751 which will be described below. The second power supply circuit 620 may be connected to the second control circuit 420 and the second driving circuit 520, and connected to the power connectors 741 and 751 which will be described below.

The board unit 300 may be coupled to the motor unit 200, and include a first circuit board 310 and a second circuit board 320 which are electrically connected to each other.

The power pack in accordance with the present embodiment may include a plurality of single ECUs, each of which is formed by connecting any one of the control units 410 and 420, any one of the driving units 510 and 520 and any one of the power supply units 610 and 620, and at least one of the ECUs may be configured to control the operation of the motor 210. When any one of the ECUs is abnormal, another one ECU may control the operation of the motor 210.

Specifically, a group in which any one of the control units 410 and 420, any one of the driving units 510 and 520 and any one of the power supply units 610 and 620 are electrically connected to one another may be referred to as a single ECU. The power pack in accordance with the present embodiment may include a plurality of single ECUs.

Each of the ECUs may perform a function of independently controlling the operation of the motor 210. In the present embodiment, the plurality of ECUs may control the operation of the motor 210 together, or at least one of the ECUs may control the operation of the motor 210.

For example, the power pack in accordance with the present embodiment may include a first ECU and a second ECU. The first ECU may include the first control circuit 410, the first driving circuit 510 and the first power supply circuit 610. The second ECU may include the second control circuit 420, the second driving circuit 520 and the second power supply circuit 620. The first and second ECUs may control the operation of the motor 210 together, or any one of the first and second ECUs may control the operation of the motor 210. For example, when the first ECU has broken down, the second ECU may operate. When any one of the first and second ECUs controls the operation of the motor 210, each of the inverters 511 and 521 may provide 50% of the rated current of the motor 210.

Through such a configuration, the power pack in accordance with the embodiment of the present disclosure can secure full redundancy for controlling the operation of the motor 210. Therefore, the power pack can secure a complementary system in which a part constituting the ECU can replace another part when the another part has broken down. In particular, when the power pack is applied to an autonomous vehicle, it is possible to secure the stability and reliability of the system.

Figure 1:
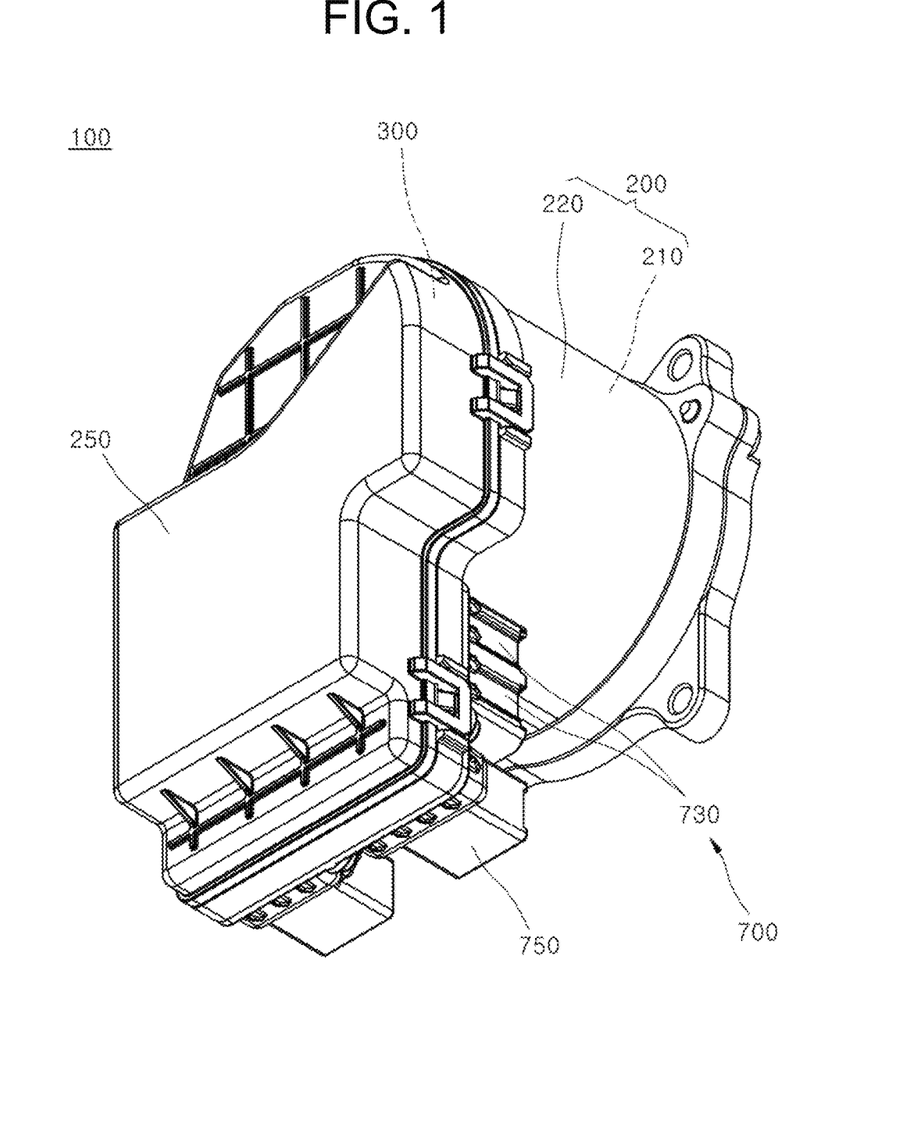
FIG. 1 is a perspective view illustrating a power pack of an EPS in accordance with an embodiment of the present disclosure.
Figure 2:
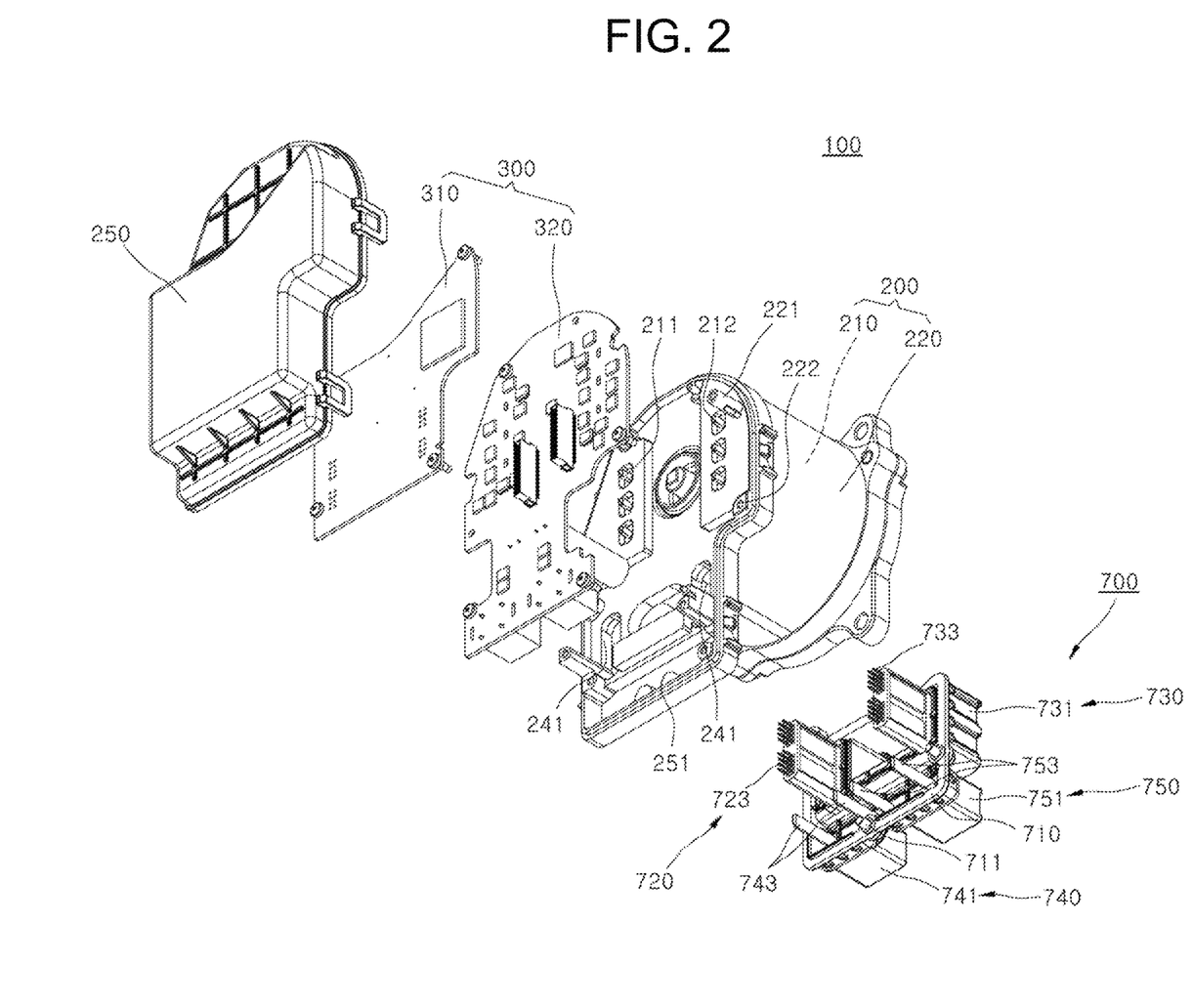
FIG. 2 is an exploded perspective view illustrating the power pack of the EPS in FIG. 1.
Figure 3:
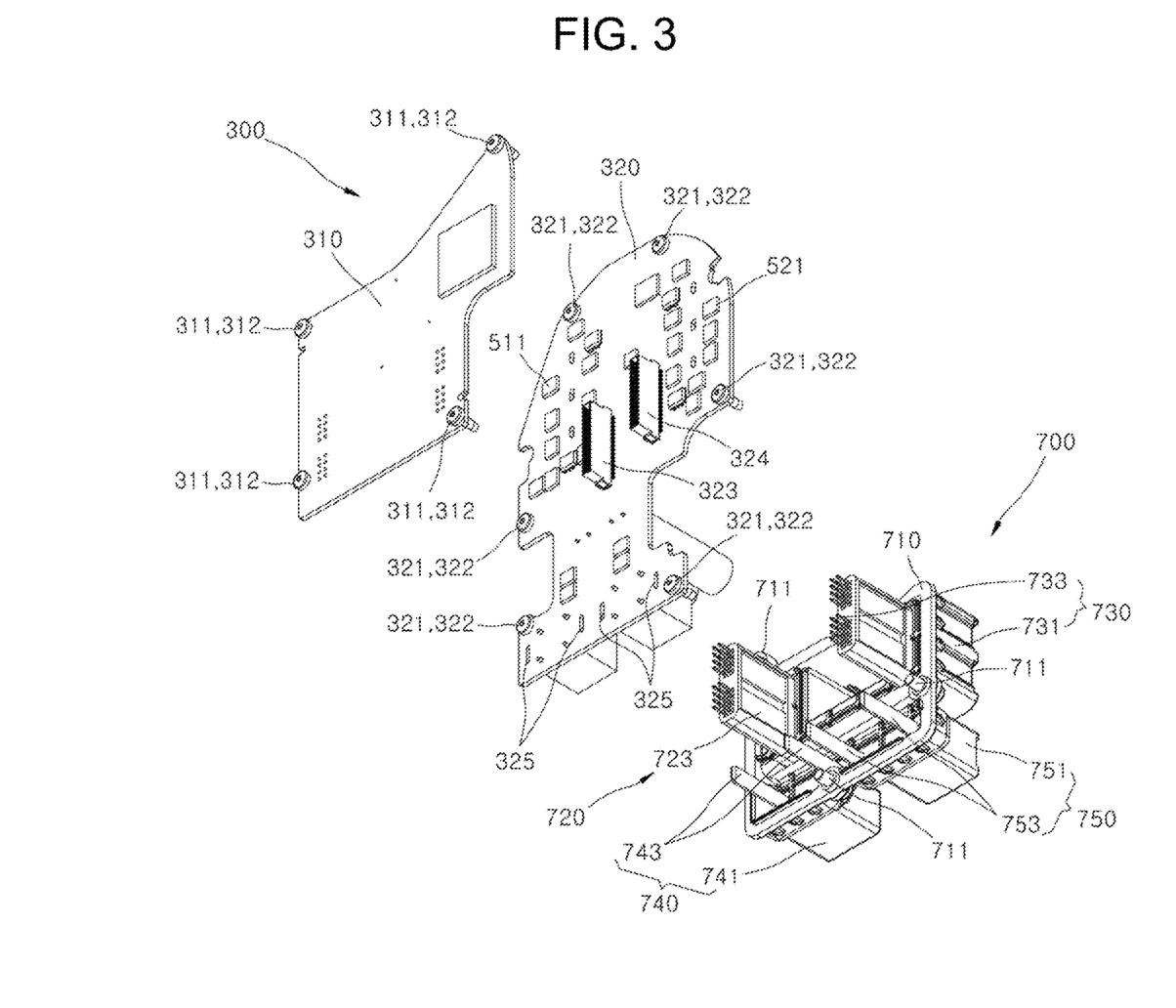
FIG. 3 is an exploded perspective view of components of the power pack except a cover and a motor unit in FIG. 2.
Figure 4:
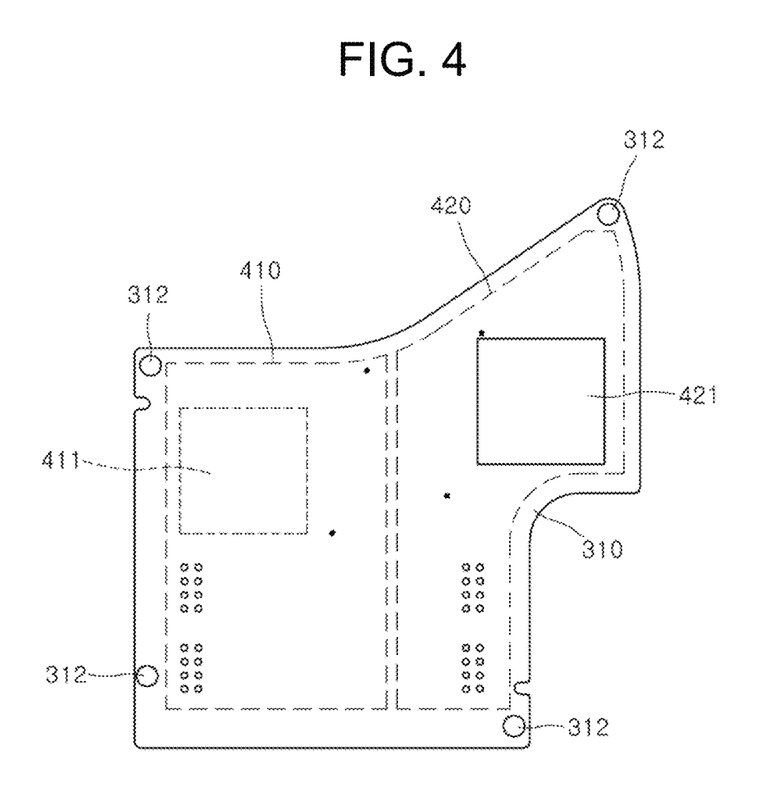
FIG. 4 is a configuration diagram illustrating a first circuit board in accordance with the embodiment of the present disclosure.
Figure 5:
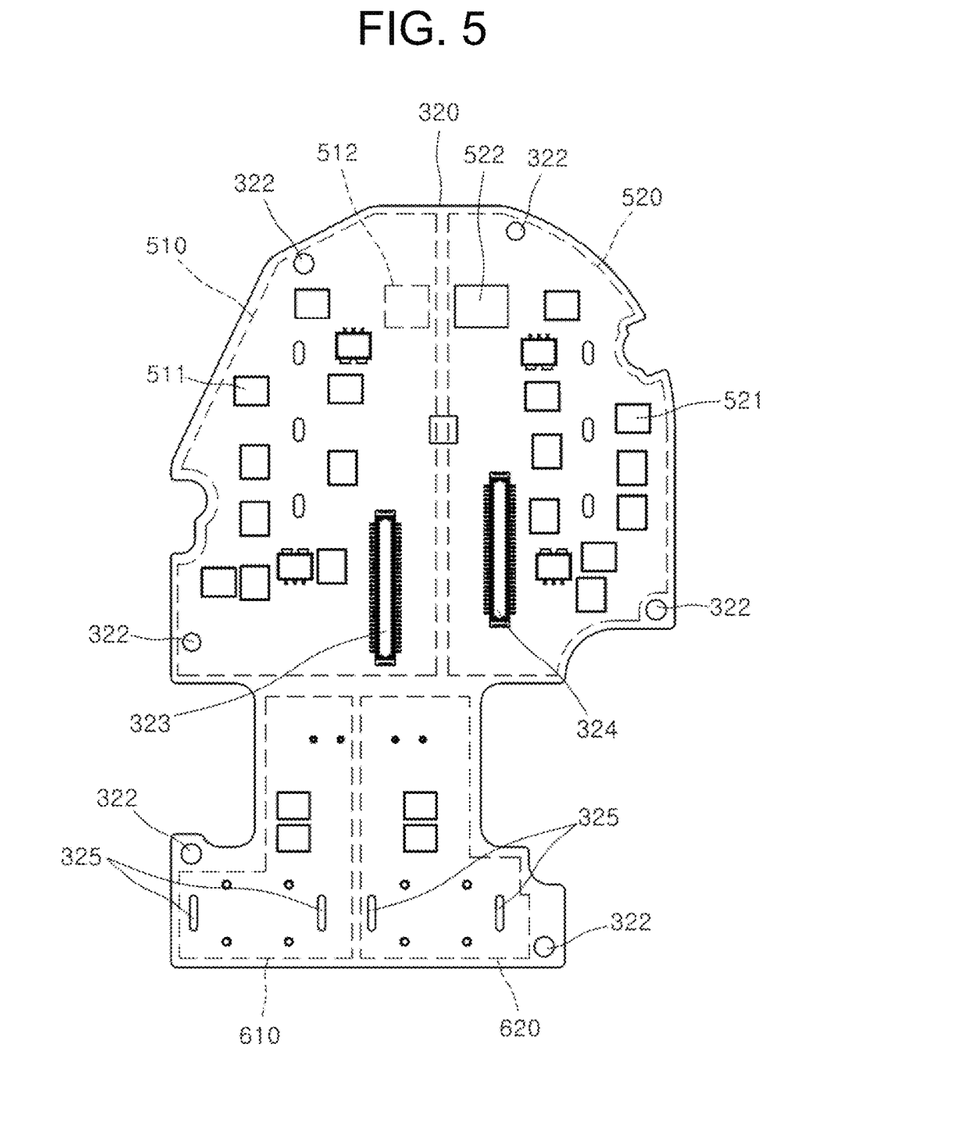
FIG. 5 is a configuration diagram illustrating a second circuit board in accordance with the embodiment of the present disclosure.

The plurality of control units 410 and 420 are installed on the first circuit board 310, and the plurality of driving units 510 and 520 and the plurality of power supply units 610 and 620 are installed on the second circuit board 320.

Specifically, the plurality of control circuits 410 and 420 may be installed in parallel to each other on the first circuit board 310. Furthermore, the plurality of driving circuits 510 and 520 may be installed in parallel to each other on the second circuit board 320, and the plurality of power supply circuits 610 and 620 may be installed in parallel to each other on the second circuit board 320.

For example, when the ECUs are configured as two ECUs, the first control circuit 410 and the second control circuit 420 may be disposed in parallel to each other on the first circuit board 310. Furthermore, the first and second driving circuits 510 and 520 may be disposed in parallel to each other on the second circuit board 320, and the first and second power supply circuits 610 and 620 may be disposed in parallel to the second circuit board 320 (see FIGS. 4 and 5).

The board unit 300 may further include board connectors 323 and 324. The board connectors 323 and 324 may be installed on the first and second circuit boards 310 and 320, and connect the control circuits 410 and 420, the driving circuits 510 and 520 and the power supply circuits 610 and 620 to transfer power and signals. The board connectors 323 and 324 may be configured as a plurality of board connectors corresponding to the respective ECUs. For example, as illustrated in the drawings, the board connectors 323 and 324 may be configured as two board connectors installed on each of the first and second circuit boards 310 and 320. Through the board connectors 323 and 324, the control circuits 410 and 420 installed on the first circuit board 310 and the driving circuits 510 and 520 and the power supply circuits 610 and 620 installed on the second circuit board 320 may be electrically connected to transmit/receive signals and to supply power.

The first and second circuit boards 310 and 320 may be formed in a plate shape, and sequentially stacked in the motor housing 220 included in the motor unit 200.

Specifically, the first circuit board 310 may have a first fastening hole 312, and the motor housing 220 may have a first coupling groove 221 formed at a position corresponding to the first fastening hole 312. As a first fastening member 311 is fastened through the first fastening hole 312 and the first coupling groove 221, the first circuit board 310 may be coupled to the motor housing 220. The second circuit board 320 may have a second fastening hole 322, and the motor housing 220 may have a second coupling groove 222 formed at a position corresponding to the second fastening hole 322. As a second fastening member 321 is fastened through the second fastening hole 322 and the second coupling groove 222, the second circuit board 320 may be coupled to the motor housing 220.

For example, as illustrated in the drawings, the second circuit board 320 may be first mounted in the motor housing 220, and the first circuit board 310 may be then mounted in the motor housing 220. However, the order in which the first circuit board 310 and the second circuit board 320 are stacked is not limited thereto, but may be changed as long as the first and second circuit boards 310 and 320 can be coupled to the motor housing 220 and electrically connected to each other.

The power pack in accordance with the present embodiment may further include a cover 250. The cover 250 may be coupled to the motor unit 200 so as to cover the board unit 300. Specifically, the cover 250 may be disposed in the opposite direction of the motor housing 220 with the board unit 300 interposed therebetween, and coupled to the motor housing 220. Therefore, the first and second circuit boards 310 and 320 may be stably coupled and protected by the cover 250.

In accordance with the present disclosure, as the circuits for implementing full redundancy for the EPS are distributed and disposed on the first and second circuit boards 310 and 320, the disposition of the circuits may be optimized, which makes it possible to accomplish the reduction in size of the apparatus.

Furthermore, in accordance with the present disclosure, the board unit 300 may be coupled to the motor housing 220, which makes it possible to simplify the assembly process while reducing the manufacturing cost.

The power pack in accordance with the present embodiment may include a connector unit 700. The connector unit 700 may be configured to transfer signals to the control units 410 and 420 and the power supply units 610 and 620 or supply power to the control units 410 and 420 and the power supply units 610 and 620.

Figure 6:
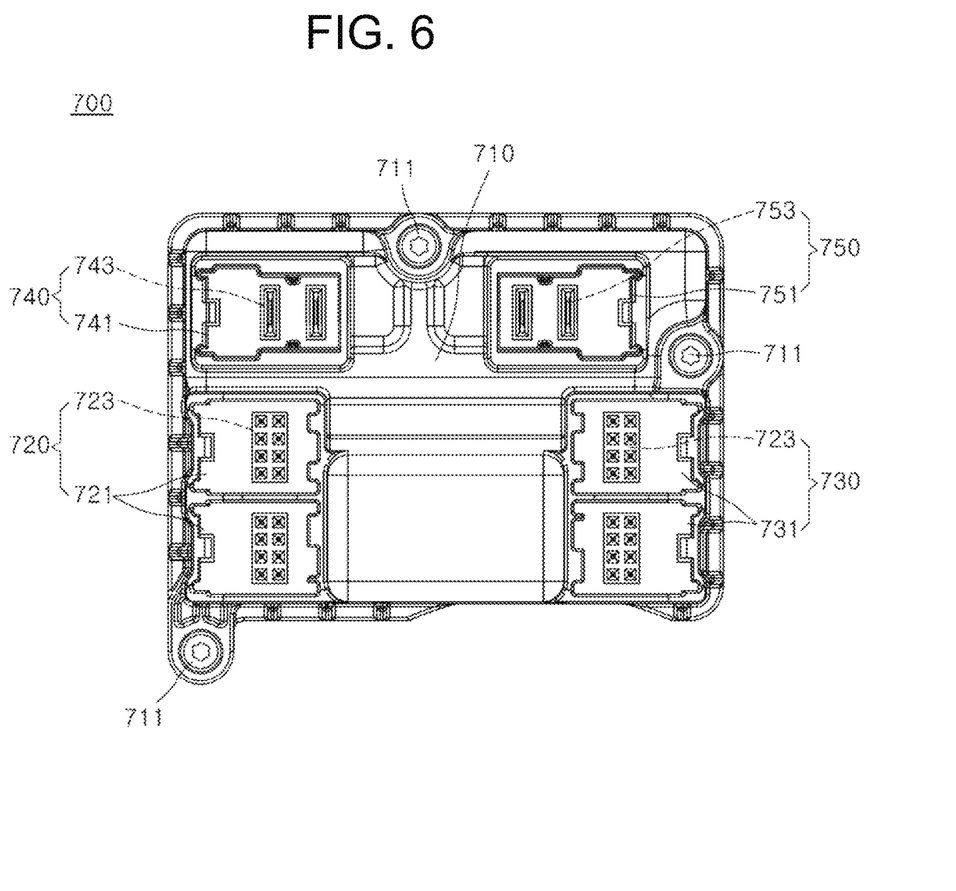
FIG. 6 is a bottom view of a connector unit in accordance with the embodiment of the present disclosure.

The connector unit 700 may include a connector body 710, a plurality of signal connector units 720 and 730 and a plurality of power connector units 740 and 750.

The connector body 710 may be coupled to the motor housing 220 included in the motor unit 200. The connector body 710 may have coupling parts 711 to be coupled to the motor housing 220. { }

The signal connector units 720 and 730 may be configured as a plurality of signal connector units 720 and 730, and the plurality of signal connector units 720 and 730 may include signal connectors 721 and 731 and signal connector pins 723 and 733, respectively. The signal connectors 721 and 731 may be formed on the connector body 710, and the signal connector pins 723 and 733 may correspond to the signal connectors 721 and 731 and protrude from the connector body 710 so as to be directly or indirectly connected to the control units 410 and 420, respectively. The signal connectors 721 and 731 may be connected to the outside and configured to transmit/receive signals, and the signal connector pins 723 and 733 may be directly connected to the first circuit board 310 or connected to the second circuit board 320, and connected to the first circuit board 310 through the board connectors 323 and 324. Through such a configuration, the signal connector pins 723 and 733 may transfer signals to the plurality of control circuits 410 and 420. The transmitted/received signals may be vehicle signals or signals of various sensors.

For example, the signal connector units 720 and 730 may be implemented as a first signal connector unit 720 and a second signal connector unit 730, the first signal connector unit 720 may be connected to the first control circuit 410, and the second signal connector unit 730 may be connected to the second control circuit 420. The first signal connector unit 720 may include a first signal connector 721 and a first signal connector pin 723, and the second signal connector unit 730 may include a second signal connector 731 and a second signal connector pin 733.

The power connector units 740 and 750 may be configured as a plurality of power connector units 740 and 750, and the plurality of power connector units 740 and 750 may include the power connectors 741 and 751 and power connector pins 743 and 753, respectively. The power connectors 741 and 751 may be formed on the connector body 710, and the power connector pins 743 and 753 may correspond to the power connectors 741 and 751 and protrude from the connector body 710 so as to be connected to the power supply units 610 and 620. The power connectors 741 and 751 may be connected to the outside so as to receive power, and supply the received power to the power supply circuits 610 and 620. The second circuit board 320 may have power pin holes 325 formed therein.

For example, the power connector units 740 and 750 may be implemented as a first power connector unit 740 and a second power connector unit 750. The first power connector unit 740 may be connected to the first power supply circuit 610, and the second power connector unit 750 may be connected to the second power supply circuit 620. The first power connector unit 740 may include a first power connector 741 and a first power connector pin 743, and the second power connector unit 750 may include a second power connector 751 and a second power connector pin 753.

In accordance with the present embodiment, the power connector units 740 and 750 and the signal connector units 720 and 730 may be formed as one body with the connector body 710 which is one molding product, thereby reducing the size of the apparatus further than the case in which the power connector units 740 and 750 and the signal connector units 720 and 730 are formed on a separate molding product in the conventional full redundancy.

As described above, the cover 250, the board unit 300 and the connector unit 700 may be coupled to the motor housing 220, which makes it possible to simplify the assembly process and to reduce the manufacturing cost.

Figure 7:
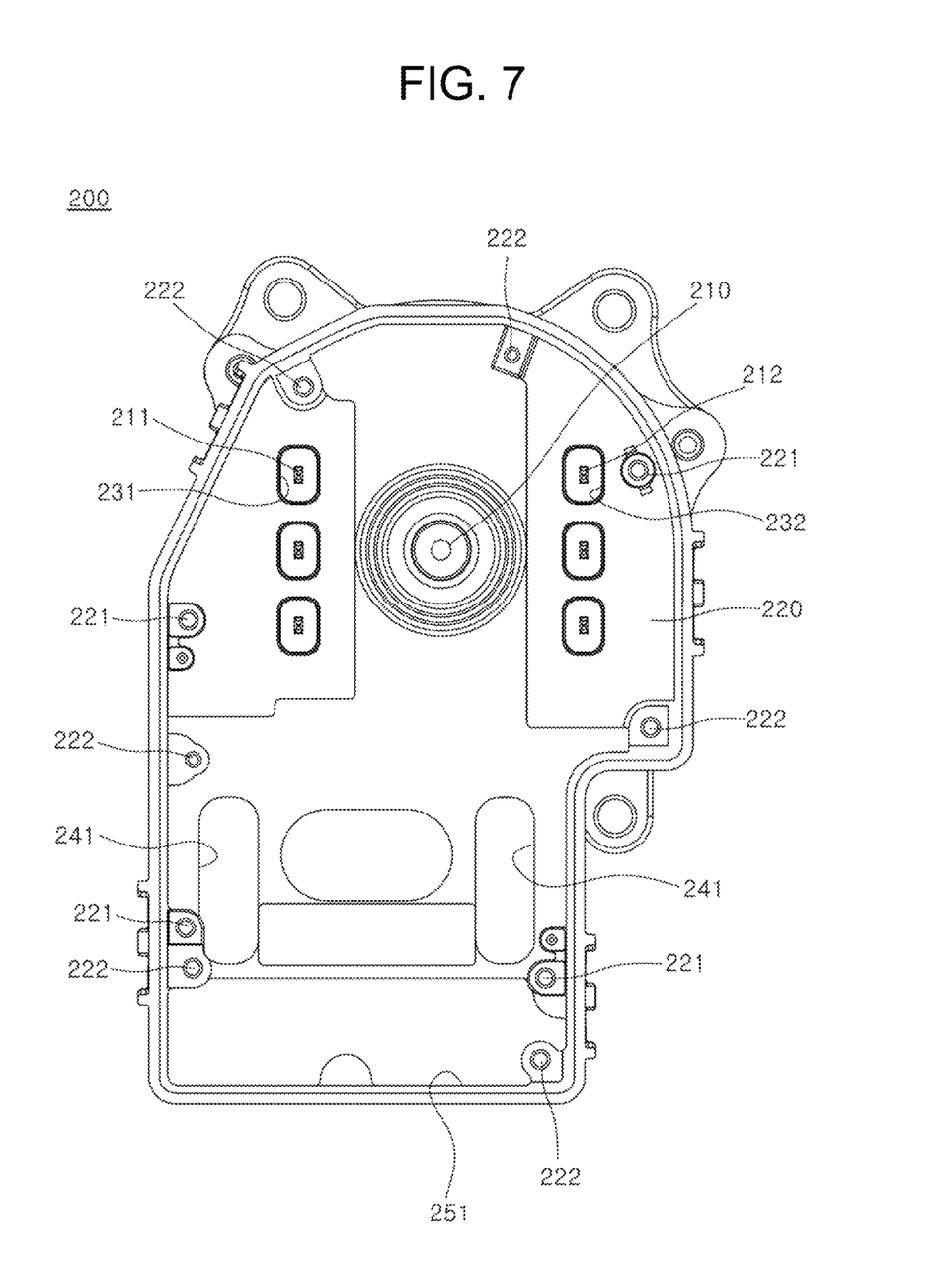
FIG. 7 is a plan view of the motor unit in accordance with the embodiment of the present disclosure.

The motor housing 220 may have winding holes 231 and 232, a signal pin through-hole 241 and a power pin through-hole 251, in order to assembly and connect the respective components. The winding holes 231 and 232 may be formed through the motor housing 220 such that the plurality of windings 211 and 212 are drawn therethrough, and the windings 211 and 212 drawn through the winding holes 231 and 232 may be connected to the respective inverters 511 and 521. The signal connector pins 723 and 733 may be passed through the signal pin through-hole 241, and the power connector pins 743 and 753 may be passed through the power pin through-hole 251.

As described above, the motor housing 220 may have the signal pin through-hole 241 and the power pin through-hole 251 and thus support the signal connector pins 723 and 733 and the power connector pins 743 and 753 of the connector unit 700, thereby stably connecting the connector unit 700 and the board unit 300.

The power pack in accordance with the embodiment of the present disclosure may implement full redundancy for the system to control the operation of the motor, thereby securing a complementary system in which any one part of the parts constituting the ECU can replace another part when the another part has broken down. In particular, when the power pack is applied to an autonomous vehicle, it is possible to secure the stability and reliability of the system.

As the circuits for implementing full redundancy for the EPS are distributed and disposed on the first and second circuit boards, the disposition of the circuits may be optimized, which makes it possible to accomplish the reduction in size of the apparatus.

Furthermore, the power connector units and the signal connector units may be formed as one body with the connector body which is one molding product, which makes it possible to reduce the size of the apparatus further than in the case in which the power connector units and the signal connector units are formed on a separate molding product in the conventional redundancy system.

Furthermore, the board unit and the connector unit may be coupled to the motor housing, which makes it possible to simplify the assembly process while reducing the manufacturing cost.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A power pack of an EPS (Electric Power Steering Apparatus), comprising:
   a motor unit comprising a motor having a plurality of windings;
   a plurality of driving units each comprising an inverter configured to drive the motor by supplying power to any one of the plurality of windings;
   a plurality of control units each comprising a controller configured to control the inverter in order to control operation of the motor;
   a plurality of power supply units configured to supply power to the motor; and
   a board unit coupled to the motor unit, and comprising a first circuit board and a second circuit board, which are electrically connected to each other,
   wherein the power pack comprises a plurality of single ECUs (Electronic Control Units), each of which is constituted by connecting any one of the control units, any one of the driving units and any one of the power supply units,
   wherein at least one of the ECUs is configured to control the operation of the motor, and any one of the ECUs is configured to control the operation of the motor when another one of the ECUs is abnormal;
   wherein the plurality of control units are installed on the first circuit board, and the plurality of driving units and the plurality of power supply units are installed on the second circuit board, and
   wherein the power pack further comprises a connector unit configured to transfer signals to each control unit and each power supply unit or supply power to each control unit and each power supply unit, the connector unit comprising a connector body coupled to a motor housing included in the motor unit, wherein the connector body is coupled to an end of the motor housing that is opposite from the second circuit board.

2. The power pack of claim 1, wherein each control unit comprises a control circuit including the controller,
   each driving unit comprises a driving circuit connected to the control circuit, and
   each power supply unit comprises a power supply circuit connected to the control circuit and the driving circuit.

3. The power pack of claim 2, wherein each control circuit is installed in parallel to each other on the first circuit board,
   each driving circuit is installed in parallel to each other on the second circuit board, and
   each power supply circuit is installed in parallel to each other on the second circuit board.

4. The power pack of claim 2, wherein the board unit further comprises a board connector installed on the first and second circuit boards and configured to connect the control circuit, the driving circuit and the power supply circuit to transfer power and signals.

5. The power pack of claim 1, wherein the first and second circuit boards are formed in a plate shape, and sequentially stacked in a motor housing included in the motor unit.

6. The power pack of claim 1, further comprising a cover coupled to the motor unit so as to cover the board unit.

7. The power pack of claim 1, wherein the connector unit comprises:
   a plurality of signal connector units each comprising a signal connector formed on the connector body, and a signal connector pin corresponding to the signal connector and protruding from the connector body so as to be directly or indirectly connected to each control unit; and
   a plurality of power connector units each comprising a power connector formed on the connector body, and a power connector pin corresponding to the power connector and protruding from the connector body so as to be connected to each power supply unit.

8. The power pack of claim 7, wherein the motor housing comprises:
   a winding hole through which the plurality of windings are drawn;
   a signal pin through-hole through which the signal connector pin is passed; and
   a power pin through-hole through which the power connector pin is passed.

* * * * *